Patented Aug. 1, 1944

2,355,029

UNITED STATES PATENT OFFICE 2,355,029

THICKENED AQUEOUS COMPOSITION AND METHOD OF MAKING THE SAME

Sidney Musher, New York, N. Y., assignor to Musher Foundation Incorporated, New York, N. Y., a corporation of New York No Drawing. Application May 4, 1944, Serial No. 534,164

9 Claims. (Cl. 252—1)

The present invention relates to thickened, viscous and stabilized aqueous compositions having unusual physical stabilizing characteristics and also to the production of gelatinous or gummy masses or compositions.

In thickening aqueous compositions it has been customary to use materials such as dextrine or British gum or other preparations such as gum tragacanth, gum karaya, India gum, etc., which are for the most part solidified exudations from various tropical trees, plants or shrubs.

These various gummy or water thickening materials are very expensive and tend to vary greatly in uniformity and purity.

Among the objects of the present invention is to provide thickened and stabilized aqueous compositions such as food and pharmaceutical compositions as ice cream, sherbets and ices, for cream cheese and other dairy products, for candies and confections, icings, fruit jellies and jams, as well as industrial compositions such as textile sizings, thickened printing inks or printing compositions, cosmetics, etc.

Still further objects and advantages will appear from the more detailed description set forth below, it being understood, however, that this more detailed description is given by way of illustration and explanation only, and not by way of limitation since various changes therein may be made by those skilled in the art without departing from the scope and spirit of the present invention.

In accordance with the present invention, it has been found that in contrast to other cereals, when a special fraction of oats has been properly separated from the oat grain and desirably finely divided, it may be used to develop unusual stabilizing, gelatinous, gummy or thickening characteristics.

These stabilizing, thickening or gummy properties are not developed in the oat grain as a whole or in ordinary oat products as, for example, in oat flour as made by grinding oat groats or in pulverized oats or oat hulls. These properties are only developed when a special fraction of the oat grain is removed from the balance of the oat grain.

This special oat fraction is a relatively low starch, relatively high protein fraction which may be obtained after removal of the cellulosic hulls of the oats and after removal of a large portion of the relatively high starch fraction.

This particular fraction of oats is best prepared by first milling the oats to remove the cellulosic hulls leaving the oat groats. These oat groats are then treated to remove the relatively high starch fraction and to concentrate the relatively high protein fraction thereof, obtaining a fraction which contains in excess of 20% protein and most desirably in excess of 22% protein.

In treating these oat groats to obtain the special stabilizer and gum fraction desired the groats are ground to such an extent that at least 50% and desirably 80% to 90% will pass through a screen or mesh or bolting cloth having a fineness in excess of 60 mesh and desirably in excess of 70 mesh. The oat groats are ground as indicated above and the ground groats are then separated as by aspirating into two fractions, namely, a coarse fraction and a fine fraction, the coarse fraction comprising the minor fraction of less than 50% by weight and most desirably comprising 10% to 20% of the total weight of the ground oat groats and the fine fraction comprising over 50% and desirably between 80% and 90% of the total weight of the ground oat groats.

It is the coarse residue which is left after such grinding and screening or bolting or after aspirating which is found to contain the properties most desirable for use as the stabilizer or gum constituent in accordance with the procedures of the present invention and the gum and stabilizing effect is most particularly observed after the coarse screenings have all been ground to a fineness of at least 50 mesh and most desirably to at least 60 mesh.

Apparently this effect is not evident or evidenced when the whole oats are ground and utilized as such or when the oat flour made by grinding oat groats is utilized as such because of the fact that other constituents therein greatly lessen, diminish or render ineffective the unusual stabilizing or gummy properties of the relatively high protein relatively low starch containing dehulled oat fraction of the present invention.

In the preferred procedure, the oat groats, after removal of the hulls by milling processes, are pulverized or ground and then by aspirating, bolting or screening, the relatively high starch containing oat fraction is removed. The pulverized oat groats may, for example, be aspirated to separate the minor fraction of the relatively low starch and relatively high protein containing materials. This process may where desired be continued by regrinding, rescreening or reaspirating until the relatively high starch material has been largely removed leaving the relatively high protein fraction behind desirably to be ground to at least 60 mesh for use in accordance with the procedure of the present invention.

The coarse fraction obtained will have a protein content in excess of 20% and most desirably in excess of 22%. At the same time the starch content of the coarse fraction will be less than the starch content of the fine fraction.

According to one preferred method of separating the relatively high starch fraction which is necessary in order to obtain the gum and stabilizing properties in the most highly developed condition, the groats are ground or pulverized or otherwise finely divided so that a major proportion thereof, say at least 50% to 80%, will have a fineness in excess of about 60 mesh and desirably at least 60% to 70% of the finely divided material will have a sufficient fineness to go through an 80 to 90 mesh screen. Then the ground material is screened, preferably through a fine silk screen, or aspirated to remove all particles which will not go through a 60 mesh screen.

A most highly desirable method is to grind the oat groats until over 75%, such as between 75% and 95% and desirably between 80% and 90% will go through a 70 mesh screen but wherein the balance of between 5% and 25% and desirably between 10% and 20% remains on the screen. Then the ground groats are aspirated or screened to remove all the coarse particles and to separate the fine fraction comprising 75% to 95% and desirably 80% to 90% from the coarse fraction comprising the balance of 5% to 25% and desirably 10% to 20% which coarse fraction is used in accordance with the procedures of the present invention.

The oat material which goes through the screen or the fine material which is aspirated will contain the relatively high starch fraction whereas the material left behind on the screen or the coarse fraction thereof will be relatively low in starch content as compared to dehulled oats.

This coarse, relatively low starch and relatively high protein material is desirably finely divided and may then be used in accordance with the procedures of the present invention, the unusual stabilizing and gum properties now being present with the removal of the cellulosic hulls and the relatively high starch fraction of the oat groats.

These coarser particles in which the stabilizing and gummy properties are concentrated are most desirably finely divided such as in a hammer or stone or attrition mill to a particle size of at least 50 mesh and more desirably so that all of the coarse particles will now go through a 60 mesh screen. This may be accomplished by first grinding the coarse particles and separating that fraction which will go through a 60 or more mesh screen followed by regrinding the remaining coarse portion and continuing the grinding and separating until all of the coarse fraction has been ground to a point where the entire coarse fraction will go through at least a 60 mesh screen.

The unusual stabilizing or thickening or gummy effects given by this particular fraction of oats is not given by any other fraction of oats or any other type of cereal or its fractions including wheat or its fractions, corn or its fractions, barley or its fractions, rye or its fractions, rice or its fractions, or other types of cereals.

Although the chemical composition may vary it has been found that at least 20% protein should be present and desirably at least 22% protein although very desirable materials have been made containing 25% to 29% protein.

It has been found possible, where desired, to bleach this special oat fraction with chlorine or hypochlorite to eliminate the dark specks. It is also possible to obtain this bleaching effect with reducing agents such as sulfites but these reducing agents are not as effective as the oxidizing bleaching agents.

The oat fraction of the present invention and which desirably has been finely divided in accordance with the procedure outlined develops the unusual gelatinous, gummy, stabilizing and thickening characteristics when agitated in water or other aqueous medium after about 15 to 30 minutes. An elevated temperature treatment is not required to develop the unusual characteristics of the present invention and the first evidence of the gummy characteristics is the slimy feel which is developed when the oat fraction and most desirably the pulverized oat fraction has been dispersed in water or similar aqueous medium.

The viscosity of aqueous solutions containing the coarse screenings herein described increases markedly upon standing even at room temperature whereas ordinary oat flour or any other cereal or seed flour or starch shows no change in viscosity when allowed to stand at room or moderate temperatures such as at temperatures up to about 140° F. to 150° F.

It has been found that when the special fraction prepared in accordance with the procedures of the present invention is suspended in water or similar aqueous medium with or without short or prolonged heating, an unusual thickening, gelatinous and gummy suspension is formed having many useful properties and which may be used as a thickening or stabilizing agent or gum in food products, pharmaceutical products, as a sizing for paper and textiles or as a stabilizing agent in physical two phase systems. For example, as little as 0.1% to 5% of the special oat fraction dispersed in water or similar aqueous medium is sufficient to show the physical stabilizing characteristics and the particularly unusual gummy and stabilizing properties.

The oat fraction of the present invention which has most desirably been finely divided may be added to a composition to stabilize the same and to produce a gelatinous, gummy and similar effect, the addition of the ground coarse screenings being made in the amount of between about 0.05% and 10% and desirably in an amount of between 0.1% and 2%.

In the manufacture of ice cream, for example, where there is used between 0.2% and 1% of gelatin, sodium alginate, algin, Irish moss or similar stabilizer, there may be employed between 0.3% and 1% of the finely ground oat fraction herein described to retard ice and lactose crystal formation, to give excellent body and texture and physical characteristics producing an ice cream of high score and stabilization. In the manufacture of ice cream the finely ground oat fraction is desirably added to the ice cream mix before pasteurizing at a temperature of, for example, 145° F. to 165° F. and the ice cream is frozen in the normal manner.

In the manufacture of icings, the oat fraction produced in accordance with the present invention and which desirably has been finely divided may be added to the icing composition in an amount of less than about 2% in lieu of pectin, algin, gelatin or similar stabilizer.

In the manufacture of cream cheese, the oat fraction may be used in an amount of between 0.5% and 1.5% in replacement for locust bean gum to retard syneresis, to give stabilization and fine body and texture and smoothness to the cream cheese.

In the manufacture of candies and confections the oat fraction which desirably has been finely divided may be used in chocolate coatings to give improved spreading and dipping qualities to the chocolate and to retard blooming. The oat fraction may also be used in fondants, gum drops, cream and marshmallow fillings, as well as for other candy and confectionery products to give unusual thickening and stabilization characteristics.

In marshmallow fillings the oat fraction may be employed in replacement for corn syrup to give a high quality marshmallow product on the basis of using, for example, from 0.3% to 1.5% of the oat fraction in lieu of 10% or more of the corn syrup normally employed.

Similarly in the manufacture of jams and jellies, fruit icings and similar compositions, the oat fraction of the present invention may be employed in place of the more expensive gums to give high stabilization characteristics.

The oat fraction may also be utilized for bakery purposes such as for pie fillings, custards and puddings and where desired the results of the present invention may be obtained without substantial gelatinization or without heating to a temperature of 160° F. or more.

The stabilizing effect may also be obtained in the preparation of relishes or in processed cheese such as pimento type cheeses as well as in salad dressings including mayonnaise, salad dressings, relish spreads, French dressing, etc.

It has been found particularly desirable for the ground oat fraction of the present invention to be added to those aqueous products containing at least 10% of a sugar such as of sucrose, dextrose, glucose, lactose, etc., and desirably 40% to 50% or more of sugar, followed by heating to an elevated temperature of at least 150° F. and desirably to a temperature of between 190° F. and 210° F. or more to develop unusual properties. For example, in the manufacture of icings the finely divided oat fraction is desirably added to the sugar mass in a small percentage of less than about 2% followed by heating in order to develop high viscosity and plasticity without syneresis and which product "pulls to a long string." This plasticity and unusual viscosity are particularly desirable in many food products such as icings, jams, fruit ripples for ice cream and in cosmetic preparations.

The special novel oat fraction of the present invention also has been found to be of great value in increasing the viscosity of aqueous compositions and solutions such as in water, milk, or the like, and which aqueous composition may contain starch, sugar, sulfonated oils, printing inks, soaps or other materials and which increased viscosity is obtained even within wide ranges of pH such as between pH 2 and pH 10.

The viscosity of aqueous compositions containing the special oat fraction herein described increases markedly upon standing even at room temperature and without an elevated temperature treatment. For example, it has been found that when the special fraction prepared in accordance with the procedures of the present invention is suspended in water or similar aqueous medium with or without short or prolonged heating, an unusual thickening, gelatinous and gummy suspension is formed having many useful properties and which may be used as a thickening or stabilizing agent or gum in food products, pharmaceutical products, as a sizing for paper and textiles or as a stabilizing agent in physical two phase systems.

For example, the special oat fraction of the present invention may be used in the preparation of cosmetics as for hand lotions, face creams, for baths or for application where a high viscosity and adhesiveness are desired. For example, from 2% to 15% of the special oat fraction may be dispersed in water preferably with agitation and used as a batch for cosmetic or dermatological purposes.

Similarly in the manufacture of pharmaceutical emulsions and cosmetic preparations the ground oat fraction may be employed in place of the expensive gums to give high stabilization characteristics. For example, from 2% to 15% of the finely divided oat fraction of the present invention may be used in the preparation of hand lotions, facial or skin creams or lotions, foot-ease powders, or other cosmetic preparation, the finely divided oat fraction giving smooth viscosity and excellent spreading qualities as well as smoothness to the skin, bleaching effects and other desirable qualities.

Furthermore in printing inks the present composition may be employed to provide a medium of high viscosity to use as a carrier for inks and in the textile industry may be employed to deepen the color of the textile and to provide good body characteristics.

Where used for pharmaceutical preparations there may be combined with the dispersed special oat fraction such products as zinc stearate, lanolin, or in connection with such products or other pharmaceutical or dermatological products there may be combined therewith bactericidal or fungicidal agents such as thymol, sodium benzoate, etc.

The unusual thickening and stabilizing effect is particularly shown upon the addition of the finely divided oat fraction of the present invention to an aqueous composition or material such as to water, milk, cream, fruit juices, water dispersions as, for example, used in the textile or pharmaceutical industries and where the pH of the aqueous composition, or, in the case of emulsions, where the pH of the external phase is within the range of pH 2.0 and pH 10.0. This wide range enables the oat fraction and preferably the finely divided oat fraction of the present invention to be used in agricultural spray emulsions, leather, paper and resin emulsions, cosmetic and drug emulsions, etc.

Still further and unusual results are obtained by first extracting the fat from the oat fraction or from the finely divided oat fraction of the present invention such as by treatment of the oat fraction or the finely divided oat fraction with a fat solvent such as the volatile hydrocarbon oils such as hexane or petroleum ether, acetone, carbon tetrachloride, ethylene dichloride or similar fat solvent or, less preferably, either an alcohol such as methyl alcohol, ethyl alcohol, propyl alcohol, iso propyl alcohol or combinations of any of the above.

The residue which is obtained following this extraction procedure and following removal of the fat has been found to develop unusually greater stabilization features with higher viscosity so that even a lesser amount of the residue from the fat extracted oat fraction or the finely divided oat fraction may be employed for stabilization of the aqueous compositions of the present invention.

By the term "aqueous composition" as used in the present application and claims is meant a composition which contains a large proportion of water and preferably a major proportion of over 50% of water. There are particularly included those compositions which are fluid at room temperatures.

In allowing the composition containing the special oat fraction to stand "for a short period of time," the composition may be allowed to stand for a period of several minutes or more. Where no moderately elevated temperatures are employed such as to 150° F. to 170° F., the time period is desirably extended to over about 15 to 30 minutes whereas where the aqueous composition containing the oat fraction is heated, the standing period can be materially reduced.

Where desired, there may be combined with the oat fraction and preferably the finely divided oat fraction of the present invention mono-glycerides or di-glycerides.

The present application is a continuation in part of application, Serial No. 401,967 entitled "Water thickening agent" filed July 11, 1941.

By the term "finely divided" as used in connection with the special oat fraction of the present invention in the application and claims is meant the oat fraction which has been subdivided to a state of fineness that will enable it to go through at least about a 50 mesh screen.

Having described my invention, what I claim is:

1. A thickened aqueous composition comprising a dispersion in an aqueous composition of the finely divided coarse fraction of dehulled oats, said fraction being substantially free of those particles which will go through a 60 mesh screen when the dehulled oats are pulverized to a fineness that will permit a major proportion thereof to pass through a 60 mesh screen.

2. A thickened aqueous composition comprising a dispersion in an aqueous composition of the finely divided coarse fraction of dehulled oats, said fraction being substantially free of those particles which will go through a 60 mesh screen when the dehulled oats are pulverized to a fineness that will permit about 80% to 90% thereof to pass through a 60 mesh screen.

3. A thickened aqueous composition comprising a dispersion in an aqueous composition of the finely divided coarse fraction of dehulled oats, said fraction being substantially free of those particles which will go through a 60 mesh screen when the dehulled oats are pulverized to a fineness that will permit a major proportion thereof to pass through a 60 mesh screen, said fraction containing in excess of about 20% total protein and said fraction having a relatively low starch and a relatively high protein content as compared to dehulled oats.

4. A thickened aqueous composition comprising a dispersion in an aqueous composition of the finely divided coarse fraction of dehulled oats, said fraction being substantially free of those particles which will go through a 60 mesh screen when the dehulled oats are pulverized to a fineness that will permit about 80% to 90% thereof to pass through a 60 mesh screen, said fraction containing in excess of about 20% total protein and said fraction having a relatively low starch and a relatively high protein content as compared to dehulled oats.

5. A method of forming a thickened aqueous composition which comprises adding to an aqueous composition a small amount of the finely divided coarse fraction of dehulled oats, said finely divided coarse fraction being substantially free of those particles which will go through a 60 mesh screen when the dehulled oats are pulverized to a fineness that will permit a major proportion thereof to pass through a 60 mesh screen, and then allowing the composition to stand for a short period of time.

6. A method of forming a thickened aqueous composition which comprises adding to an aqueous composition a small amount of the finely divided coarse fraction of dehulled oats, said finely divided coarse fraction being substantially free of those particles which will go through a 60 mesh screen when the dehulled oats are ground to a fineness that will permit about 80% to 90% thereof to pass through a 60 mesh screen, and then allowing the composition to stand for a short period of time.

7. A method of forming a thickened aqueous composition which comprises adding to an aqueous composition a small amount of the finely divided coarse fraction of dehulled oats, said finely divided coarse fraction being substantially free of those particles which will go through a 60 mesh screen when the dehulled oats are ground to a fineness that will permit a major proportion thereof to pass through a 60 mesh screen, said finely divided coarse fraction containing in excess of about 20% total protein and said finely divided coarse fraction having a relatively low starch and a relatively high protein content as compared to dehulled oats, and then allowing the composition to stand for a short period of time.

8. A method of forming a thickened aqueous composition which comprises adding to an aqueous composition a small amount of the finely divided coarse fraction of dehulled oats, said finely divided coarse fraction being substantially free of those particles which will go through a 60 mesh screen when the dehulled oats are ground to a fineness that will permit about 80% to 90% thereof to pass through a 60 mesh screen, said finely divided coarse fraction containing in excess of about 20% total protein and said finely divided coarse fraction having a relatively low starch and a relatively high protein content as compared to dehulled oats, and then allowing the composition to stand for a short period of time.

9. A method of forming a thickened aqueous composition which comprises adding to an aqueous composition a small amount of less than 15% of the finely divided coarse fraction of dehulled oats, said finely divided coarse fraction being substantially free of those particles which will go through a 60 mesh screen when the dehulled oats are ground to a fineness that will permit about 80% to 90% thereof to pass through a 60 mesh screen, said finely divided coarse fraction containing in excess of about 20% total protein and said finely divided coarse fraction having a relatively low starch and a relatively high protein content as compared to dehulled oats, and then allowing the composition to stand for a short period of time, said aqueous composition containing in excess of 50% of water.

SIDNEY MUSHER.